April 15, 1924.
J. T. LAWRENCE
1,490,835
SEED COTTON CULLER
Filed Nov. 18, 1920    2 Sheets-Sheet 1
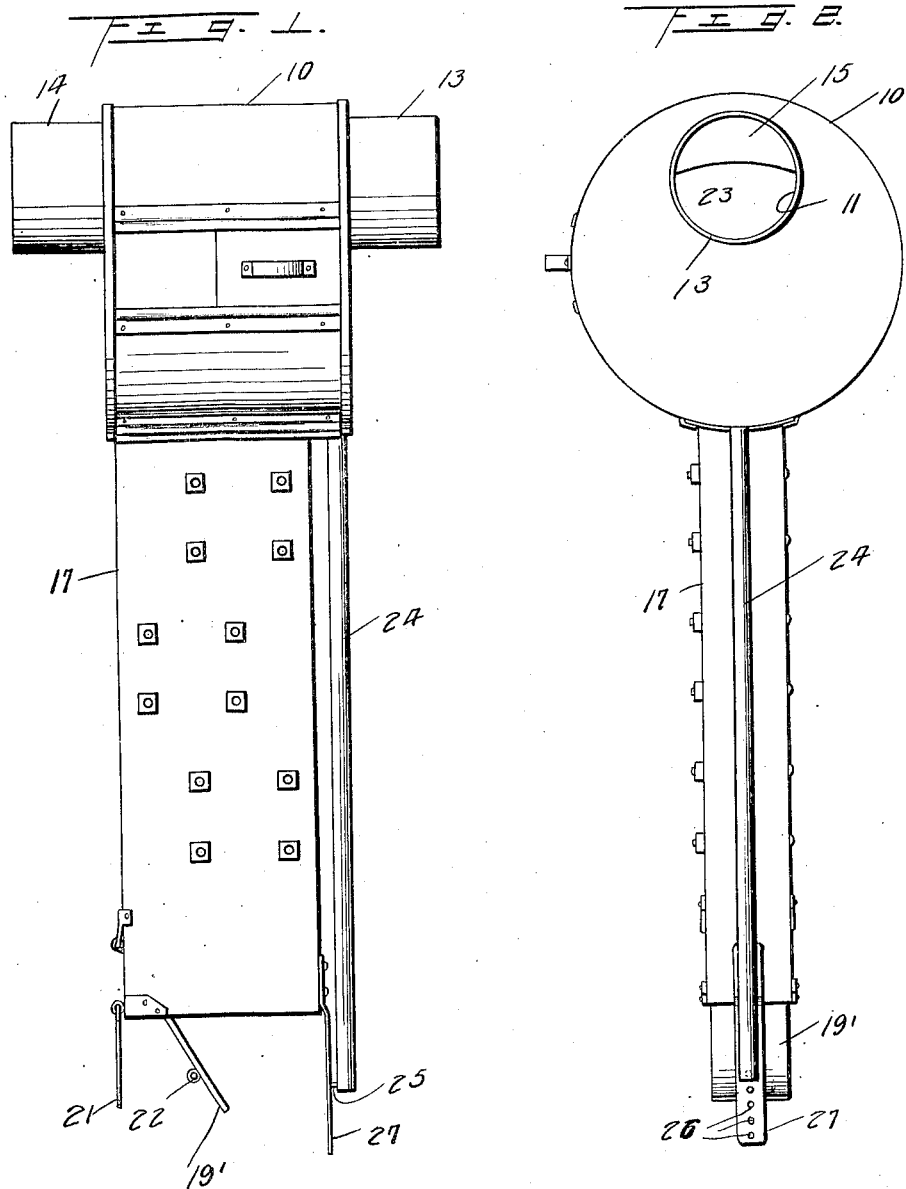
Inventor
J. T. Lawrence.

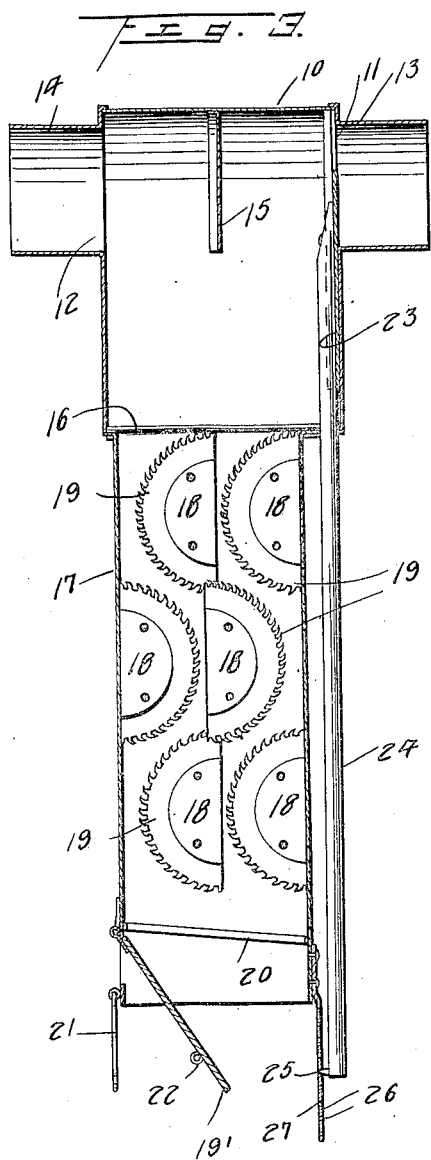
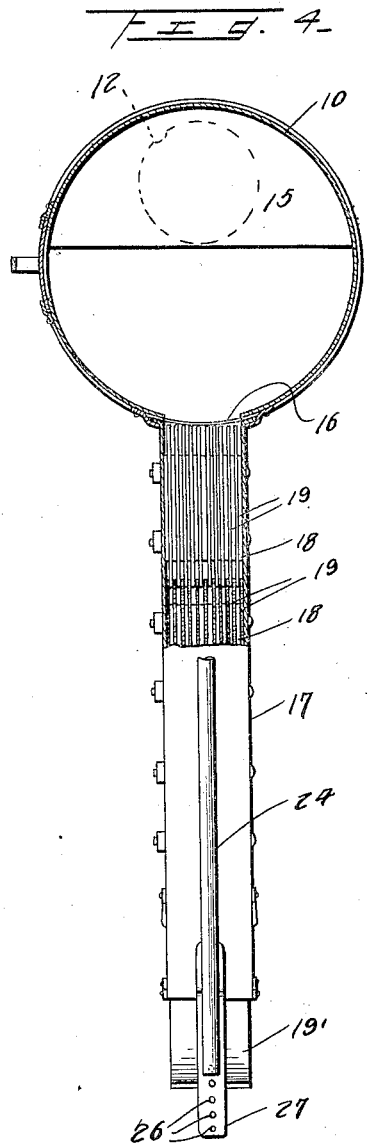
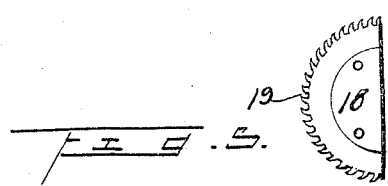

Patented Apr. 15, 1924.

1,490,835

UNITED STATES PATENT OFFICE.

JOHN T. LAWRENCE, OF SPARTANBURG, SOUTH CAROLINA.

SEED-COTTON CULLER.

Application filed November 18, 1922. Serial No. 601,741.

*To all whom it may concern:*

Be it known that I, JOHN T. LAWRENCE, a citizen of the United States, residing at Spartanburg, in the county of Spartanburg, and State of South Carolina, have invented certain new and useful Improvements in Seed-Cotton Cullers; and I do hereby declare the following to be a full, clear, and exact description of the invention, such as will enable others skilled in the art to which it appertains to make and use the same.

The object of the invention is to provide a simplified and improved construction of seed cotton culling apparatus operating substantially on the principle of that disclosed in my Patent #1,340,063, granted May 11, 1920, and having advantages particularly in the matter of the separation of hard objects from the cotton and the detachment of lint from such objects in the disposal of the latter, and in the removal of the lint from the detaching means and in the general operation of the device whereby an increased efficiency is secured while the possibility of mixing the cotton belonging to separate successive bales due to the liberation at the feeder of the contents of a succeeding bale before the completion of the ginning of the cotton of the preceding bale and which in practice is objectionable, is entirely eliminated by the cutting off of the suction from the feeder during the cleaning of the separator elements of the culler; and with these objects in view the invention consists in a construction and combination and relation of parts of which a preferred embodiment is shown in the accompanying drawings, wherein:

Figure 1 is a side view of a culler embodying the invention.

Figure 2 is an end elevation of the same.

Figure 3 is a longitudinal sectional view thereof.

Figure 4 is a transverse sectional view showing the outlet chute partly broken away.

Figure 5 is a detail view of one of the separator units.

The drum 10 which as illustrated is of cylindrical form as being the preferred construction is provided with inlet and outlet passages 11 and 12 communicating with openings in parallel diametrical heads 13 and 14 and close to the top of the drum in substantial alignment, with an interposed baffle plate 15 which extends downward to a plane below the bottom of the said inlet and outlet passages and which is substantially midway between the same as illustrated. In the bottom of the drum and extending practically throughout the length thereof is an outlet opening 16 with which communicates outlet chute 17 arranged vertically in pendant relation with the drum and in a position to receive any hard objects such as stones, metal and the like which may be carried by the cotton and which is deflected downwardly by contact with the baffle plate interposed between the inlet and outlet openings of the drum, said chute being interiorly fitted with separator units 18 defining a zig-zag path through which the said objects may pass in their progress to the lower end of the chute. In the construction illustrated these separating units consist of series of parallel segmental, preferably semi-circular peripherally toothed plates 19, which in practice may consist of half-sections or segmental sections of gin saw gangs which are alternately disposed with relation to the side walls of the chute so as to produce the zig-zag or circuitous passage way, and the teeth of the blades are directed upwardly so as to catch and hold the seed cotton which may be carried into the chute by the objects entering the same and traversing the passage by gravity, the lower end of the chute being normally closed by means of a hinged gate or valve 19' seated upon a transverse horizontal abutment 20 constituting a valve seat. Obviously the discontinuance or reduction of the suction blast will permit of the dropping by gravity of the gate valve and hence the discharge of the heavy objects which have accumulated thereon, while the leakage of air past the valve which does not necessarily seat in air tight relation with the chute casing, serves to remove loose seed cotton from the chute and from the teeth of the separating units to avoid clogging thereof and hence interference with the downward progress of the heavy objects. To permit of securing the valve or gate in its open position when it is desired to cause a positive draft through the chute to remove seed cotton from the separating units a fastening means may be employed such as a hook 21 swingingly mounted upon the chute casing for engagement with a suitable eye or staple 22. The fastening means obviously is designed to prevent the closing of the gate valve during the operation of removing the lint which has accumulated on the separating units and during this operation it is preferred to cut off the suction from the feed station to which extends the drum or pipe communicating with the inlet passage or opening of the drum, and to this end a slide valve 23 is mounted upon the head 13 of the drum for movement either into partial or complete closing relation with said inlet opening, an operating rod 24 being connected with the said valve and being provided at its extremity with a pin 25 for engagement selectively with openings 26 in a bracket 27 depending from the lower end of the chute. The closing of the inlet opening or passage through the drum during the cleaning of the separating units of the chute has the further advantage, in addition to directing the complete force of the suction through the chute, of preventing the introduction of material from a fresh bale at the feeding station with the objectionable result of mixing the contents of two successive bales, it being obvious that the cotton which has passed through the drum and has proceeded to the gin remains under operation for a considerable time after the last of the bale has passed through the drum and hence during an interval in which it is convenient to open the chute to relieve the separator units of the accumulation of lint thereon.

It will further be noted that by the arrangement of the outlet opening or the passage in an abrupt wall or head 14 of the drum and arranging the outlet into the waste chute throughout the length of the drum provides against the possibility of heavy and objectionable objects being carried by the blast through the drum instead of being eliminated in accordance with the purpose of the drum. These heavy objects even though they may be carried with considerable force by the blast in its passage from the feeding station to the drum, upon encountering the transverse baffle plate interposed between the inlet and outlet passages of the drum are thrown downward and directly into the chute wherein the opposing current of air is of such a reduced speed or force as not to have any tendency to interfere with the downward passage of such objects to the lower end of the chute where they can readily be disposed of, as above indicated, by the dropping of the gate valve.

While the preferred embodiment of this invention is shown and described it will be understood that minor changes in the details of construction and arrangement of parts may be resorted to within the scope of what is claimed without departing from the spirit of the invention.

Having thus described the invention, what I claim is:—

1. A seed cotton culler having a drum provided with opposite inlet and outlet openings and a baffle plate disposed between them, an outlet chute extending from the drum, a valve within the drum operable to control the inlet opening, and operating means for the valve extending through the wall of the drum and exteriorly of the outlet chute.

2. A seed cotton culler having a drum provided with opposite inlet and outlet openings and a baffle plate disposed between them, an outlet chute extending from the drum, a valve within the drum operable to control the inlet opening, operating means for the valve extending through the wall of the drum and exteriorly of the outlet chute, and cooperating fastening means between the chute and operating means to secure the valve in adjusted position.

3. A seed cotton culler having opposite inlet and outlet openings and a baffle plate interposed between them, the culler having a downwardly arranged discharge passageway, separating units in zigzag relation in said passageway, and each unit consisting of a series of toothed blades.

4. A seed cotton culler having a drum provided with opposite inlet and outlet openings and an interposed baffle plate, a chute depending from and communicating with the drum at its bottom, and means for varying the exposure of the inlet opening, said chute being provided at its lower end with a gate valve adapted to open by gravity, said means consisting of a slide valve, an operating rod connected with said valve and provided with a terminal stud, and a bracket having a series of openings for selective engagement by said studs.

5. A seed cotton culler having a drum provided with opposite inlet and outlet openings and an interposed transversely arranged baffle plate, and a chute depending from and communicating with the bottom of the drum and provided with separating units disposed to form a zig-zag passage and provided with upwardly directed teeth.

6. A seed cotton culler having a drum provided with opposite inlet and outlet openings and an interposed transversely arranged baffle plate, and a chute depending from and communicating with the bottom of the drum and provided with separating units disposed to form a zig-zag passage and provided with upwardly directed teeth, each of said units consisting of a series of parallel spaced peripherally toothed segmental blades.

7. A seed cotton culler having a drum provided with opposite inlet and outlet openings and an interposed transversely arranged baffle plate, and a chute depending from and communicating with the bottom of the drum and provided with separating units disposed to form a zig-zag passage and provided with upwardly directed teeth, said chute being provided at its lower end with a gate valve adapted to open by gravity and means for securing the same in open position.

In testimony whereof I affix my signature in presence of two witnesses.

JOHN T. LAWRENCE.

Witnesses:
H. E. CHAPMAN.
SANDY E. HATCHETT.